United States Patent
Harvey

[11] 3,720,148
[45] March 13, 1973

[54] APPARATUS HAVING AN AUTOMATIC RANGE FINDER MECHANISM

[75] Inventor: Donald M. Harvey, Rochester, N.Y.

[73] Assignee: Eastman Kodak Company, Rochester, N.Y.

[22] Filed: May 18, 1970

[21] Appl. No.: 38,304

Related U.S. Application Data

[63] Continuation-in-part of Ser. No. 743,471, July 9, 1968.

[52] U.S. Cl. .................................. 95/44 C, 250/204
[51] Int. Cl. ................................................ G03b 3/00
[58] Field of Search ........................... 95/44; 250/204

[56] References Cited

UNITED STATES PATENTS

| 2,495,355 | 1/1950 | Stahl | 95/44 A |
| 3,325,647 | 6/1967 | Sugier | 250/204 |

*Primary Examiner*—Samuel S. Matthews
*Assistant Examiner*—Richard A. Wintercorn
*Attorney*—Robert W. Hampton and William C. Dixon, III

[57] ABSTRACT

A photographic camera or the like, using triangulation for range distance measurement, and having an automatic range finder mechanism. The apparatus is arranged to sweep a modulated light beam across a plane which includes a subject of interest, and the reflected light returning to the apparatus is imaged on spaced photoelectric transducers differentially connected to produce a varying electrical signal. The range finder mechanism includes a cam having a predetermined cam surface indicating defined range distances and adapted to move as a function of the sweeping light beam. When the reflected light falls equally on the photoelectric transducers, an output signal is developed and applied to an electromechanical transducer which arrests further rotational displacement of the cam. The range distance is thus established by the cam position, and any utilization means, such as a camera objective lens or the like, may be employed to utilize the range distance intelligence defined by the cam position.

3 Claims, 7 Drawing Figures

DONALD M. HARVEY
INVENTOR.

BY
ATTORNEYS

DONALD M. HARVEY
INVENTOR.

BY William C. Dixon, III
Robert W. Hampton
ATTORNEYS

DONALD M. HARVEY
INVENTOR.
ATTORNEYS

APPARATUS HAVING AN AUTOMATIC RANGE FINDER MECHANISM

CROSS-REFERENCE TO RELATED APPLICATION

This is a continuation-in-part of application Ser. No. 743,471, filed July 9, 1968.

See copending application for Automatic Range Finder Electronic Circuitry, Ser. No. 743,370, filed on July 9, 1968, in the names of Jerome A. Frazee and Howard E. Murphy, and assigned to the same assignee as the present invention.

BACKGROUND OF THE INVENTION

This invention relates to apparatus such as a photographic camera or the like, wherein a modulated beam of illumination is directed from a source within the apparatus toward a subject for which range distance intelligence is required. The light reflected from the subject is received on spaced phototransducer means for the purpose of determining a null position indicative of the correct range distance. By triangulation concepts, the angle through which the light beam has rotated is a function of the range distance to the subject. A cam means having a predetermined cam surface indicating defined range distance is arranged to move in predetermined displacement as a function of the sweeping light beam. An output signal is developed when the reflected light falls equally on the photoelectric transducer means. Circuitry suitable for developing the output signal is described in the copending application for "Automatic Range Finder Electronic Circuitry," Ser. No. 743,370, filed on July 9, 1968, in the names of Jerome A. Frazee and Howard E. Murphy and assigned to the same assignee as the present invention.

The output signal is applied to electromechanical transducer means which lock in the cam means of the apparatus against further displacement. The range distance intelligence is then defined by the locked position of the cam means, and any utilization means, such as a camera objective lens or the like, may be employed to utilize the range distance intelligence defined by the cam position.

It is known in the art to use photosensitive transducers for rangefinding. U.S. Pat. No. 3,274,914 to *Biedermann* et al. discloses an automatic rangefinding mechanism for a camera in which two identical photosensitive transducers are utilized to achieve a null indicative of proper range, the null being detected when the electrical resistances of the respective transducers are equal.

U.S. Pat. No. 3,035,176 to Kis et al. relates to a monoscopic range finder for navigation purposes in which the target range is ascertained by causing light from the target to fall on two photocells, one stationery and the other movable. The two photocells, providing differential outputs, are arranged in a bridge circuit, the bridge being arranged electrically to enable the range to be calculated from a balanced condition.

SUMMARY OF THE INVENTION

The invention relates to a device for determining the range from the device to a subject of interest. The device comprises means for projecting a beam of electromagnetic radiation, such as visible or invisible light, from the device and means for moving the projected beam through a plurality of angular displacements to locate the subject and thereby effect a reflection of the projected beam from the subject back to the device. Means, separated from the projecting means by a predetermined distance and adapted to be aimed at the subject, are provided for sensing the reflection. The sensing means includes first and second juxtaposed radiation-responsive elements adapted to receive the reflection and to generate first and second electrical signals, respectively, in response to receiving the reflection, the first and second electrical signals being equal when the reflection is received in equal intensities by the first and second radiation-responsive elements. The device further comprises means, coupled electrically to the sensing means, for establishing an electrical null condition when the first and second electrical signals are equal and for generating a third electrical signal in response to the null condition. Means, coupled electrically to the establishing means and responsive to the third electrical signal, are also included for providing a representation of the range as a function of the aforementioned predetermined distance and the one of the angular displacements through which the projected beam is moved to locate the subject.

In the preferred embodiment of the invention, the device is incorporated in apparatus such as a photographic camera or the like wherein a modulated beam of illumination is directed through transmitting lens means towards a subject for which range distance intelligence is required. The reflected light from the subject is received by receiving lens means positioned a predetermined distance from the transmitting lens means, and imaged on spaced photosensitive transducer means. Cam means adapted to be cocked and uncocked, and having a predetermined cam surface indicating defined range distances, is adapted for rotational displacement as a function of the light beam. Electronic detection means detects a null position when the light beam provides equal radiant energy on the photosensitive transducer means and provides an output signal. Electromechanical means responsive to the output signal then arrests rotation of the cam means. The range distance has been established, and any utilization means, such as a camera objective lens or the like, may be employed to utilize the range distance intelligence defined by the cam position.

The novel features of the invention are set forth with particularity in the appended claims. The invention itself, however, both as to its organization and method of operation, together with objects and advantages thereof, may best be understood by reference to the description to follow, considered in connection with the accompanying drawings.

DESCRIPTION OF THE PREFERRED EMBODIMENT

The invention is here illustrated in conjunction with a still photographic camera, but it should of course be understood that the inventive concept is equally useful in any apparatus wherein automatic range finding is required to be accomplished.

Figure 1:
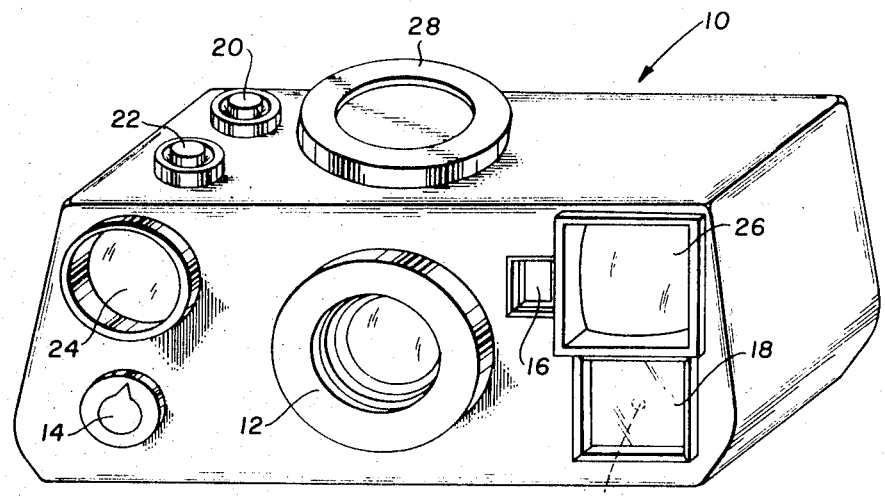
FIG. 1 is a pictorial view of a photographic camera utilizing an automatic rangefinder mechanism in accordance with one illustrative embodiment of the invention.

Referring now to FIG. 1, a photographic camera is indicated generally at 10. The principal parts of the photographic camera are: the photographic objective or lens indicated at 12, the shutter setting dial 14, the photometric detector 16, the view finder 18, a focus determining mechanism release member 20, the lens/shutter release member 22, a projection objective such as transmitting or image-forming lens 24, a photodetector objective or receiving lens 26, the winding advance member 28, and a transparent dot 30.

Figure 2:
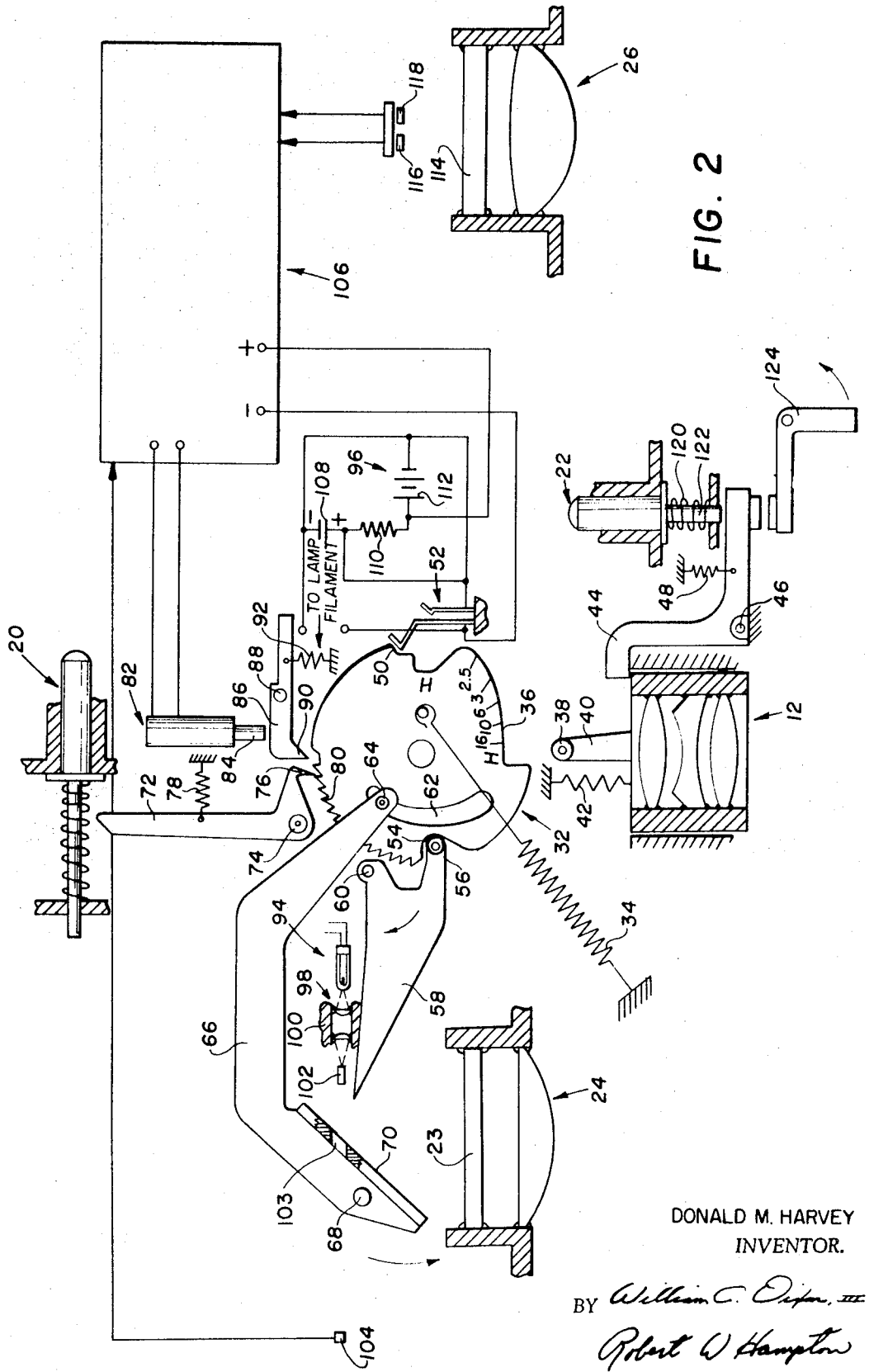
FIG. 2 is a schematic diagram showing the automatic range finder mechanism in accordance with the instant invention.

Referring now to FIG. 2, where the automatic range finding concept is illustrated in greater detail, a cylindrical cam means indicated generally at 32, is mounted within the camera 10, and connected to a biasing power spring 34, so that it is disciplined to rotate in the clockwise direction when in the uncocked position. The cam means 32 has a number of surfaces of predetermined configuration adapted for cooperation with the other components comprising the automatic range finder mechanism. Range indicating surface 36 is specially contoured, and in its arrested position the cam means 32 cooperates with a roller 38 carried by member 40 which is connected to the photographic objective 12. The objective lens 12 is resiliently urged in the direction of the cam means 32 by means of biasing spring 42. However, the objective lens 12 is releasably held away from the cam means by means of a clamping means 44 which is pivoted at 46 and held in the locked position by means of spring 48. The positions marked on range indicating surface 36 as H, 16, 10, 6, 3, 2.5 and H indicate the range distance in feet. As will be made clear, the instant invention will arrest the rotational displacement of the cam means 32 at any of these positions when the correct range has been determined. In the particular embodiment shown in FIG. 1, H in both identifications on indicating surface 36 represents the hyperfocal distance, which for the camera of this illustrative embodiment, is approximately 27 feet.

The cam means 32 includes a shoulder portion 50 which is arranged so that, upon rotation of cam means 32, a switch indicated at 52 will be forced closed. Cam 32 further includes a rest position at 54, adapted for cooperation with a roller 56 of a chopper reed actuator 58. The chopper reed actuator 58 is pivoted about 60, and is adapted for rotation in the clockwise direction as indicated by the arrow. Cam means 32 further includes a slotted cam surface 62, adapted to cooperate with a follower member 64 arranged at one end of a mirror support member 66 which is pivoted about hinge 68 and supports a mirror 70. Hinge 68 is suitably located to adjust the average distance between mirror 70 and lens 24 as mirror support member 66 is pivoted in response to rotation of cam means 32, thereby compensating for changes in camera-to-subject distance to enhance the image-forming efficiency of lens 24. Between mirror 70 and lens 24 a filter 23 may be provided to filter out any undesired portion of the spectrum of light reflected by mirror 70 toward lens 24. A rocker arm locking member 72 is pivoted at 74, and is releasably held in locking engagement with cam member 32 by means of a projection 76 acting under the discipline of biasing spring 78, to fit into the ratchet tooth sector 80 arranged on the cam 32 as indicated.

A solenoid, indicated generally at 82, is arranged so that its plunger 84, upon actuation, strikes an arresting pawl 86. The arresting pawl 86, pivoted at 88, includes a projection 90 adapted to fit into the ratchet tooth sector 80 on the cam, the arresting pawl 86 being biased away from the cam surface (in a clockwise direction) by means of biasing spring 92.

A lamp, indicated at 94, is electrically ELECTRICALLY connected with switch 52, which controls the energizing circuit indicated generally at 96. The lamp 94 is arranged so that, when energized, the light it provides passes through a lens system or condenser 98, mounted in a baffle wall 100 in the camera. The light passed by the condenser 98 is interrupted by a chopper reed 102, which conveniently may be a piece of steel supported at one end in the manner of a cantilever; it is actuated by the chopper reed actuator 58, at 1 kilocycle per second.

A photosensitive detector, which may be a phototransistor 104, is arranged in any convenient manner to intercept the modulated light passed by the actuated chopper reed member 102. In the embodiment here illustrated, the modulated light passes through a hole 103 in the mirror. The changes in light intensity received by the phototransistor 104 are translated into varying electrical signals of predetermined periodicity which are then applied to the detector circuitry indicated generally at 106.

The automatic range finder detector circuitry 106 is the subject of the copending application for AUTOMATIC RANGE FINDER ELECTRONIC CIRCUITRY, Ser. No. 743,370, filed on July 9, 1968 in the names of J. A. Frazee and H. E. Murphy, and assigned to the same assignee as the present invention.

The energizing circuitry 96 comprises an electrolytic capacitor 108, a resistor 110, and a battery source 112. The electrolytic capacitor 108, observing the polarity indicated in FIG. 2, is connected across the lamp 94, and also in series with resistor 110 and battery 112. The negative side of electrolytic capacitor 108, the negative terminal of the battery 112 and the stationary element of switch 52 are all connected in common. The positive terminal of battery 112 is connected to the positive connection (+) of the range detector circuitry 106; the negative connection (−) of the range detector circuitry 106 is connected to the movable element of switch 52. Finally, the stationary element of the switch 52 is connected to the + side of the electrolytic capacitor 108.

The light received by the photodetector objective or receiving lens 26, having passed through a filter 114, is arranged to be focused on a pair of photosensitive elements 116, 118, which are here illustrated as photodiodes. The photodiodes provide two electrical inputs which are utilized in the electronic detector circuitry 106, as indicated by the arrows on the lead lines.

The lens shutter member 22 is positioned in proximity to clamping means 44; it is urged away from the clamping means 44 by means of a spring 120. When the lens shutter member is actuated, the plunger end 122 strikes the clamping means 44, causing it to pivot clockwise about 46 and thereby release the objective lens 12. The pivoting clamping means 44 then strikes rocker arm 124 which will actuate the shutter (not shown).

OPERATION OF THE DEVICE

If he has not already done so previously, the camera user actuates a lever (not shown) which rotates the cam means 32 in a counterclockwise direction against the biasing action of spring 34. Cam means 32 is held against clockwise rotation by means of member 72, the projection 76 engaging the ratchet tooth sector 80 on the cam means 32 in locking arrangement. This is the cocked position of the cam means 32.

The user of the camera views the subject S to be photographed through the viewfinder 18, the camera being aimed at the subject S by moving the camera 10 so as to aim the small transparent dot 30 (FIG. 1) on the viewfinder window at the subject S. While in this position, the correct range setting is obtained; however, it should be clearly understood that by obtaining the range setting for a particular subject, this will not dictate the final composition of the picture, and the photographic scene may still be subject to personal arrangement by the camera user. For example, should he wish the subject to be left or right of center, this can be done after the range distance is found, simply by moving the camera so as to encompass the desired background, as viewed in the viewfinder 18, disregarding the position of the transparent dot 30.

Next, the focus determining mechanism release member 20 is depressed. The movement of the member 20 displaces the rocker arm member 72, thereby removing the restraint against clockwise rotation of the cam means 32 provided by projection 76. Cam means 32 begins to rotate now in a clockwise direction. As the cam means 32 rotates, it closes electrical switch 52, and at the same time, the chopper reed actuator 58 is pivoted about 60 in a clockwise direction. The action of member 58 causes the chopper reed 102 to be displaced, so that the reed vibrates at about 1 kilocycle per second; the amplitude of vibration of the reed 102 is depicted in FIG. 3D.

The closing of the switch 52 electrically: (a) energizes the detector circuit 106 and (b) connects the lamp 94 across the electrolytic capacitor 108.

The energizing circuit for the detector circuitry 106 may be traced: + terminal of battery 112, positive connection (+) of circuitry 106, negative connection (−) of circuitry 106, through the now closed switch 52, to the (−) terminal of battery 112.

The electrolytic capacitor 108 has been in closed circuit relationship with battery 112 so that it is charged to the potential of the battery 112. Upon the closing of switch 52, the electrolytic capacitor 108 discharges through the filament of lamp 94 (FIG. 3A). Since chopper reed 102 is actuated, a modulated light beam is passed to the mirror 70 to be there reflected through the filter 23 and transmitting lens 24 at a predetermined angle. The modulated light also passed through aperture 103 in the mirror 70 to the phototransistor 104, which translates the incident light energy into electrical signals which are applied to the electronic detector circuitry 106.

In the position shown in FIG. 2, the cam means 32 is cocked and the setting for the hyperfocal distance H. which is about 27 feet. As the cam means 32 is rotated clockwise, it is moved successively from the setting for the hyperfocal distance H. through the setting for 16 feet, etc.

Reference should now be had to FIGS. 4–7, which depict the dynamics for obtaining a null indicative of the range distance to a subject S. In order to simplify the explanation, only the components which play a leading role are indicated in these schematics. A few definitions and observations are in order. An imaginary plane normal to the ground, parallel to the camera, and including the subject S has been denominated the subject plane. For purposes of explaining the operation of the device, it will be assumed that objects other than the subject S are also in the subject plane. The range distance is the distance $d$ from the camera to the subject plane. Finally, since by construction, the lenses 24 and 26 are spaced apart at a predetermined distance, (in the illustrative embodiment described, they are 4 ⅜ apart), this distance constitutes one known side of a triangle.

Figure 4:
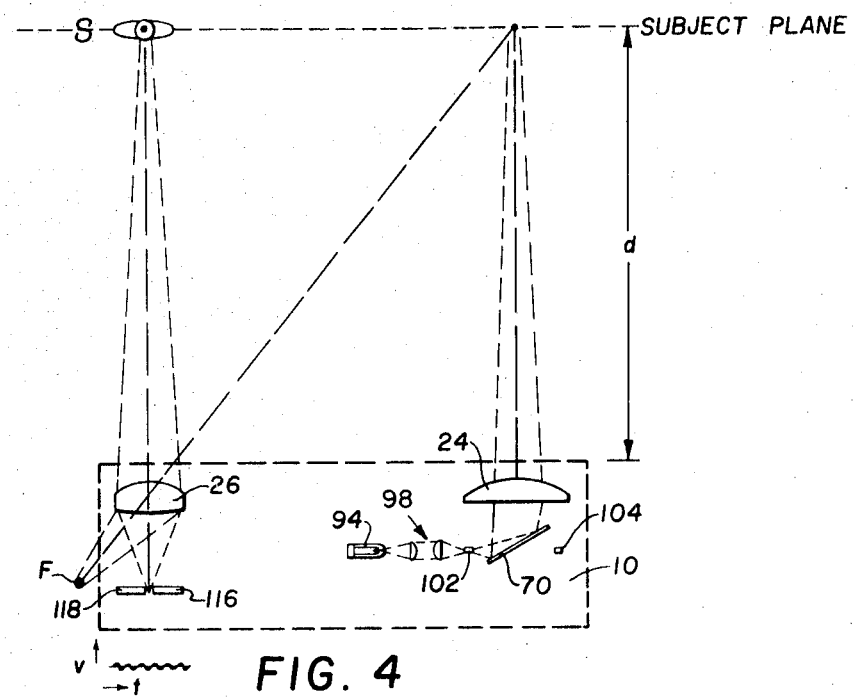
FIGS. 4–7 are schematic diagrams depicting the dynamics of the automatic range finder mechanism to achieve a null indicative of the correct range distance to a subject.
Figure 5:
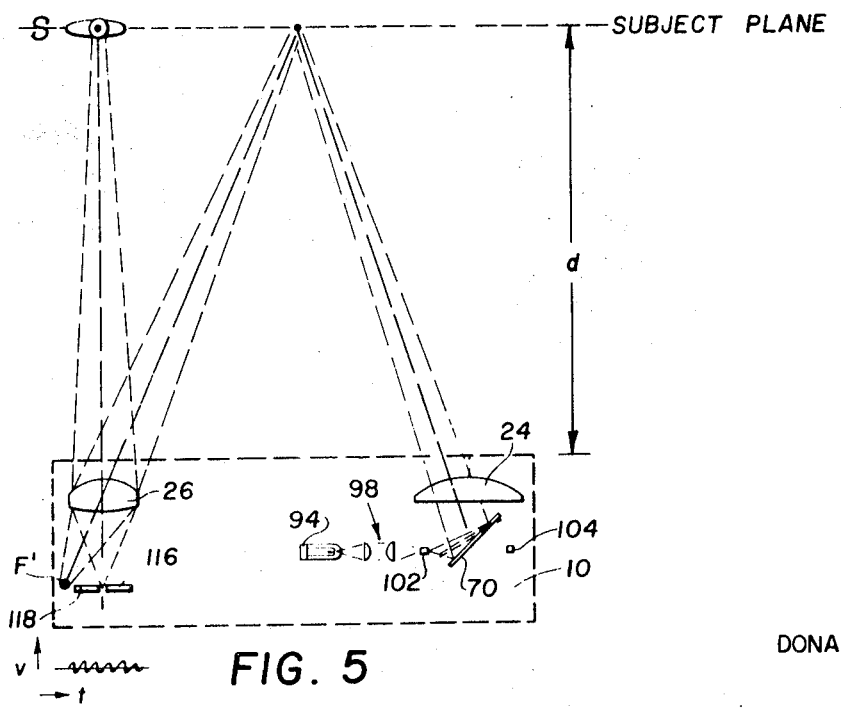
Figure 6:
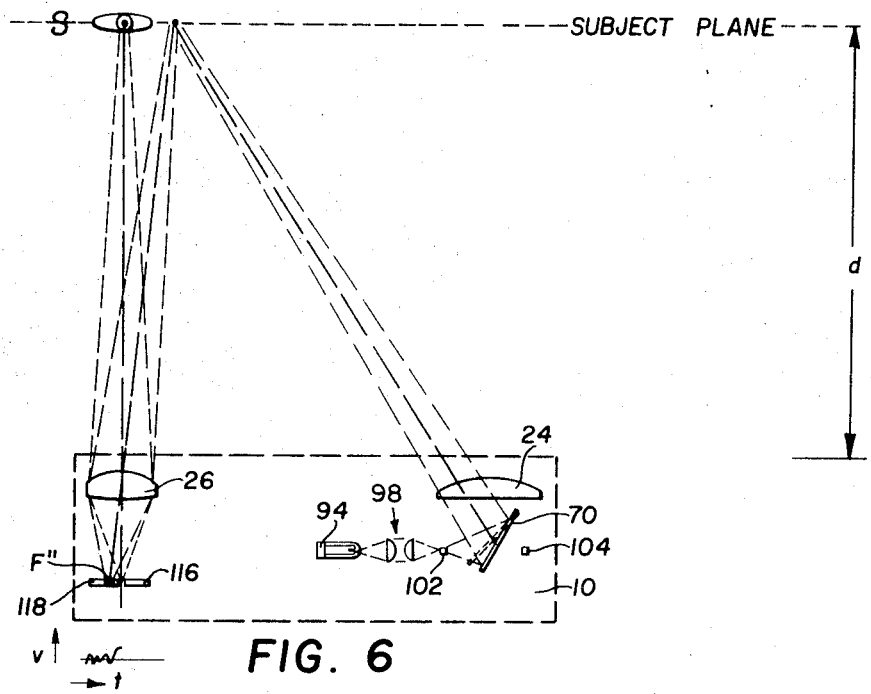

In FIG. 4, the cam means 32 is cocked at the setting for the hyperfocal distance H. In review, the camera 10 has been aimed (in effect the dual diodes 116, 118 are aimed), by means of the transparent dot 30 in the viewfinder reticle (FIG. 1), at the subject S. The light from the transmitting lens 24 produces an image of the lamp filament which is reflected by an object in the subject plane and received by the receiving lens 26 and attempted to be imaged at F. This is beyond the planar surfaces of the photodiodes 116, 118. Effectively, there is no output from the detector circuitry. The waveform shown below the diodes 116, 118 is random noise. As the mirror 70 rotates (FIG. 5), the image of the filament is again reflected by an object in the subject plane and received by the receiving lens 26, and is attempted to be imaged at F'. Still, this is beyond the planar surfaces of the photodiode pair 116, 118.

As the beam continues to sweep through a still greater angle (FIG. 6), the reflected image of the filament received by lens 26 appears at F'' on photodiode 118, and the detector circuitry 106 develops a positive going voltage signal as noted in the voltage waveform. The detector circuitry 106 is arranged so that a signal of one polarity is developed when the image of the filament is on one photodiode, and a signal of opposite polarity is developed when the image of the filament falls on the other photodiode. It is unimportant which polarity is selected — it is only important to determine the cross-over potential which will arise when the image of the lamp filament falls in the spacing in the photodiodes 116, 118.

Finally, when the mirror has rotated through an angle B (FIG. 7), the light beam has swept through a corresponding angle of 2B and the image of the filament is reflected by the subject S toward the lens 26. The reflected image of the filament received by lens 26 now appears at F''' in the spacing between photodiodes 116, 118; the voltage signal developed within the detector circuitry 106 now goes through zero, and starts to go negative as the filament is imaged on photodiode 116. Stated differently, the image of the lamp filament on the subject plane has now moved to the subject S, so that when reimaged on the plane of the diodes 116, 118 by the receiving lens 26 it falls in the separation between the photodiodes 116, 118; the outputs of the photodiodes 116, 118 are now equal.

Figure 7:
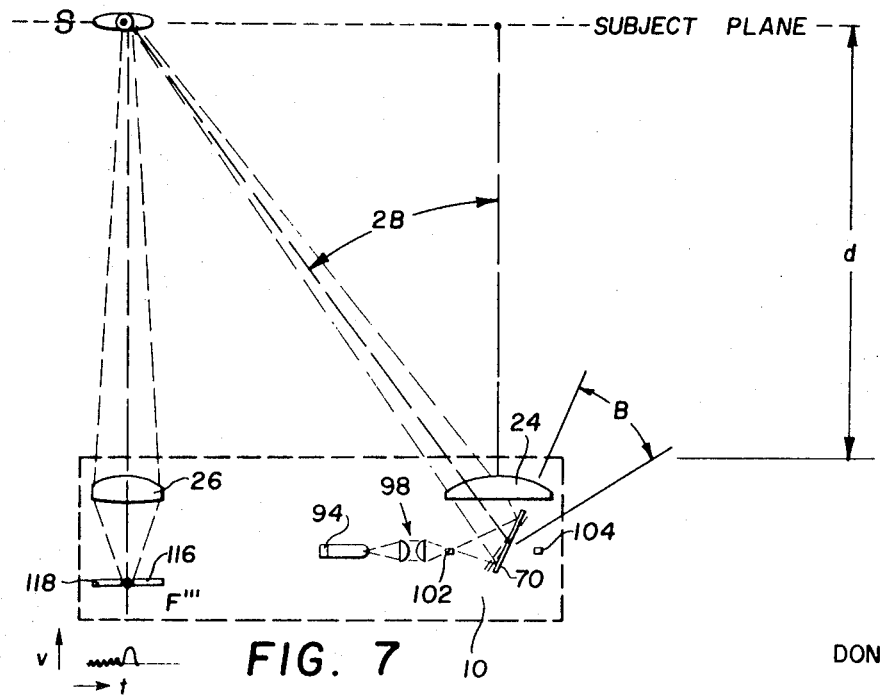

The electronic detector circuitry 106 is arranged to ascertain the cross-over point which will be the situation shown in FIG. 7. When this is accomplished, the circuitry 106 sends a signal (FIG. 3E) to the solenoid 82 (FIG. 2), energizing it, and the plunger 84 moves outwardly, striking the arresting pawl 86, forcing the pointed end 90 into locking engagement with the ratchet tooth sector 80 on the cam means 32. This action locks the cam means 32 in fixed position, and accordingly, further displacement of the cam means 32 is now arrested. The cam means 32 is now at the correct range distance setting; range $d$ may be mathematically calculated by trigonometric methods, using the angle 2B or any other convenient angle. This is, of course, only of academic interest to a camera user since the manufacturer has performed these calculations in the design of the cam means 32.

Figure 3:
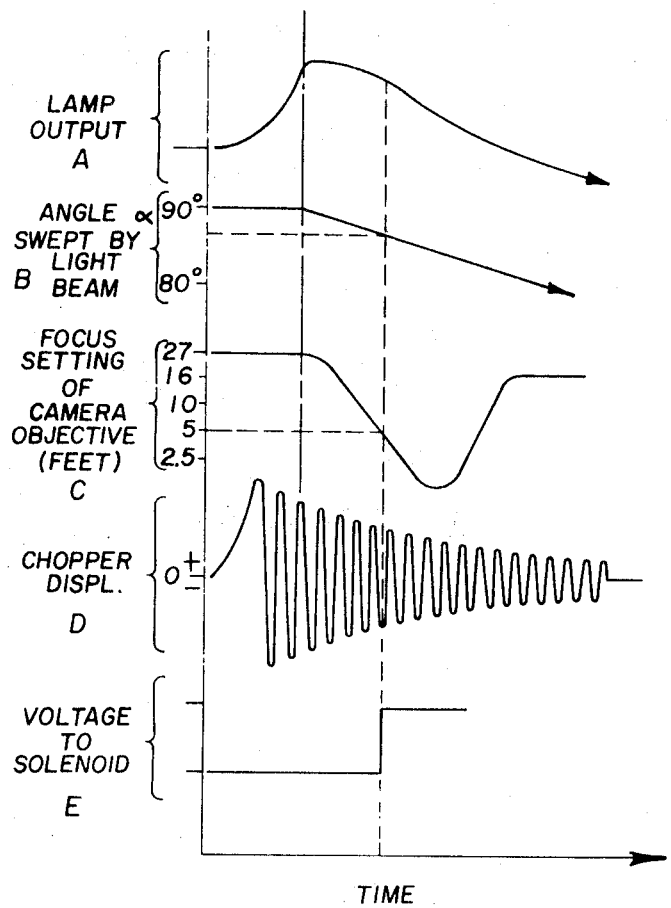
FIG. 3 depicts various wave forms used in explaining the operation of the device.

Referring back to FIG. 3, it has been assumed that the light beam has swept through an angle 2B (FIG. 3B), and the cam means 32 has been arrested indicating that the subject S is at a distance of 5 feet from the camera (FIG. 3C). As stated previously, the user is now free to compose his picture by arranging the subject S in his viewfinder 18 anywhere along the subject plane without reference to the transparent dot 30 appearing thereon.

If the cam member has rotated through the range 16 feet to 2.5 feet, and the detector circuitry 106 has not provided an output signal, then this simply means that the subject S is beyond the 16 foot range and therefore the hyperfocal setting H (second position) of the cam means should be used.

When the range distance has been determined, and the subject S has been composed in the viewfinder 18 to the satisfaction of the operator, lens/shutter release member 22 is then displaced, the plunger end 122 tripping the clamping means 44 and releasing the objective lens 12 so that roller 38 is moved into engagement with the setting on the range indicating surface 36. The pivoting movement of the clamping means 44 trips the shutter release rocker arm 124, thereby opening the shutter blades to produce a latent image of the scene on the photographic film. As indicated earlier, once the range distance has been determined, this intelligence may be used for any useful purpose, and is not limited to camera photography.

In the illustrated embodiment described, the automatic ranging has been from approximately 2.5 feet to 16 feet. However, it will be understood that the range may easily be extended, depending only upon the design of the cam means 32.

The invention has been described in detail with particular reference to the preferred embodiment thereof, but it will be understood that variations and modifications can be effected within the spirit and scope of the invention.

I claim:

1. In automatic focusing apparatus having means for forming a beam of light, means for projecting and moving the beam of light through a range of positions to illuminate at least a portion of an object to be photographed, an objective lens adapted to form an image of the object in a primary image plane, focusing means coupled to the objective lens and adapted to move the objective lens along a predetermined path, the combination comprising:
    a. photosensitive means adapted to receive light reflected from the object and having at least one electrical parameter which varies as a function of the brightness of incident illumination;
    b. means coupled to said photosensitive means and adapted to produce a signal in response to a magnitude of the parameter which is a function of the distance between the object and the predetermined location;
    c. cam means defining a cam surface movable through a range of positions representative of distances between an object and the reference plane;
    d. means responsive to the signal for retaining said cam means in a selected one of said positions representative of the distance between the object and the reference plane; and
    e. follower means coupled to the focusing means and movable to engage said cam means at said one selected position for positioning the objective lens along the path to focus the image of the object in the reference plane.

2. The invention as set forth in claim 1 wherein said photosensitive means includes first and second photosensitive devices disposed in a predetermined spaced relation with respect to each other and each adapted to receive light reflected from the object and having parameters which respectively vary as a function of the brightness of incident illumination.

3. In automatic focusing apparatus having means for forming a beam of light, means for projecting and moving the beam of light through a range of positions to illuminate at least a portion of an object to be photographed, and objective lens for forming an image of the object in a primary image plane, focusing means coupled to the objective lens and adapted to move the objective lens along a predetermined path, the combination comprising:
    a. first and second photosensitive devices disposed in predetermined spaced relation with respect to each other and having parameters which vary as a function of the brightness of incident illumination;
    b. means coupled to said photosensitive devices and adapted to produce a signal when the parameters of each of said photosensitive devices are predetermined relative magnitudes;
    c. cam means defining a cam surface, rotatable through a range of positions representative of distances between an object and the reference plane, said cam means being rotatable in a first condition and arrested in a second condition;
    d. electro-mechanical means responsive to said signal to engage said cam means for arresting the rotation of said cam means disposing it in said second condition at said one selected position; and e. follower means coupled to said focusing means and movable to engage said cam means at said one selected position for positioning the objective lens along the path to focus the image of the object in the reference plane.

* * * * *